No. 636,788. Patented Nov. 14, 1899.
F. W. FRENCH.
GOPHER OR SQUIRREL TRAP.
(Application filed Mar. 6, 1899.)
(No Model.)
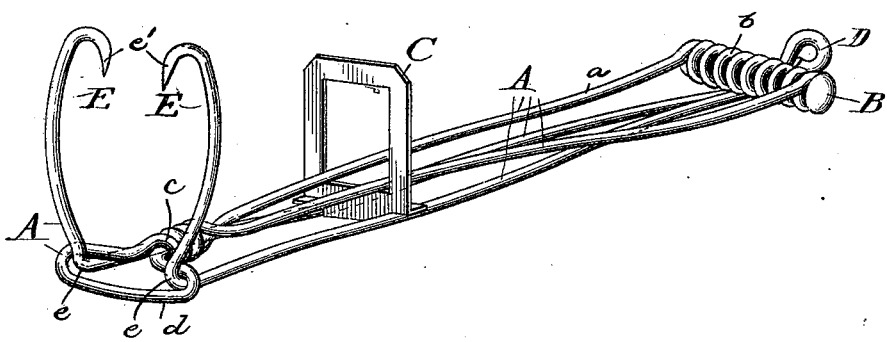
Fig. 1.
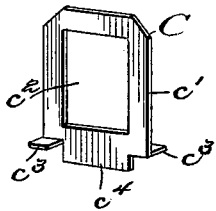
Fig. 3.
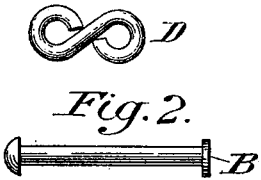
Fig. 4.
Fig. 2.
Witnesses:
J. P. R. Hall
D. G. Gordon
Inventor:
Frederick Wm French.
THE NORRIS PETERS CO., PHOTO-LITHO., WASHINGTON, D. C.

UNITED STATES PATENT OFFICE.

FREDERICK WM. FRENCH, OF LAKESIDE, CALIFORNIA.

GOPHER OR SQUIRREL TRAP.

SPECIFICATION forming part of Letters Patent No. 636,788, dated November 14, 1899.

Application filed March 6, 1899. Serial No. 708,049. (No model.)

*To all whom it may concern:*

Be it known that I, FREDERICK WM. FRENCH, a citizen of the United States, residing at Lakeside, in the county of San Diego, State of California, have invented certain new and useful Improvements in Gopher or Squirrel Traps, of which the following is a specification.

This invention relates to improvements in gopher and squirrel traps, and has for its object to provide simple and effective means for trapping animals of the character set forth or other small animals, and wherein the parts of the trap are primarily manually set and subsequently automatically released by the animal endeavoring to pass therethrough in a certain direction and operate to grip and hold the animal with sufficient security to prevent accidental release by struggle or muscular effort on the part of the entrapped animal, but which can be easily manipulated by an attendant for releasing purposes.

The invention consists in the construction and arrangement of the several parts, which will be more fully hereinafter described and claimed.

In the drawings, Figure 1 is a perspective view of a trap embodying the features of the invention and shown set. Fig. 2 is a detail view of a rivet used in the spring-coil of the trap. Fig. 3 is a detail perspective view of the set-plate. Fig. 4 is a detail view of an attaching-link.

Similar letters of reference are employed to indicate corresponding parts in the several views.

A designates a continuous wire forming the main body of the trap and comprising an upper tongue $a$, which converges from a rear coil $b$ toward the front of the trap, where it is formed with connecting-coils $c$ in rear of a set-loop $d$. The coils $c$ are provided by winding one member of the tongue around the other, and the loop $d$ is elongated transversely of the front of the trap.

Through the medium of the coil $b$ the normal position of the tongue $a$ will be elevated, and from the central lower portion of the said coil the terminals of the wire of which the body of the trap is formed are extended forwardly in divergent planes to a point where bends $e$ are provided at the base of upstanding gripping-arms E, which have inturned oppositely-positioned pointed hooked ends $e'$. The coil $b$ is reinforced and given a certain amount of rigidity by a rivet or bolt B, and connected thereto is a link D, preferably of S shape, and to which is adapted to be attached a holding-chain or other analogous device for retaining or securing the trap in the location desired and to prevent it from being dragged away by the entrapped animal or other means.

A set-plate C is employed in connection with the trap and comprises a main body $c'$, adapted to be erected perpendicularly when applied, and has therethrough an opening $c^2$. The lower opposite corners of the plate C are cut and bent in opposite directions to provide horizontal supporting-feet $c^3$, and thus leave a depending guard $c^4$, having a width about equal to the transverse extent of the opening $c^2$ and greater than the normal interval between the terminals of the wire carrying the arms E.

In setting the trap the plate C is disposed as shown by Fig. 1 and so that the tongue $a$ will have its opposite members projecting through the opening $c^2$. The guard $c^4$ is then forced downwardly between the terminals of the wire carrying the arms E to spread the same apart, and simultaneously the loop $d$ is pulled down and held locked under the bends $e$. The feet $c^3$ of the plate C will then bear firmly on the upper portions of the opposite terminals of the wire carrying the arms E, and all the parts will be in condition for the passage between the said arms E of a small animal or other animal for which the trap may be adapted. The loop $d$ will be depressed far enough to avoid the formation of an obstruction to entrance between the arms, and intermediately the said arms are bowed in opposite lateral directions. After all the parts have been set as specified the arms E will be held apart and against movement until the set-plate is overthrown and released. The trap in its set condition is then disposed in a suitable manner in a runway or hole of the animal to be trapped, and, if desired, it may be in part hidden, being held in a positive manner by the attaching device connected to the link D at the place or in the location desired and in such manner as to avoid detection by the animal. The animal passes between the arms E, and striking the plate C will release the latter and permit the arms E to spring together and release the loop $d$, which will also spring upwardly over the arms and throw the animal against the pointed hooked ends $e'$ and also prevent the said arms from spreading. By this operation the said hooked ends $e'$ are driven into the body of the animal, and the latter is thereby held against escape.

The opening in the plate C is beneficial and a material advantage by reason of the fact that the animal is permitted to look beyond the same and be encouraged to continue in a forward direction over the trap. If said plate were of solid construction, it would set up an obstruction and frighten the animal and in all probability cause him to try to move out from the trap, which might be easily accomplished before the same was sprung. It will also be observed that when the trap is sprung the plate C does not become disconnected, but is held on the tongue $a$ and will therefore be prevented from becoming lost. In releasing the animal from the trap the tongue $a$ is pressed downwardly and the arms E spread apart.

The main advantages of the present construction of trap are that an unobstructed and clear passage to the set-plate is afforded, thus allowing the animal to enter the trap without encountering frightening obstructions. The animal is encouraged to go straight ahead with the result of springing the trap, and in this automatic action the several parts have a quick and strong action and allow no possible means for the animal to escape. A further advantage is the location of the pointed hooked ends of the arm E at the top of the entrance of the trap, so that there will be no interference with the animal in his work of burrowing and bringing out dirt, but rather giving more freedom to shove the dirt on the bottom of the hole. Structurally the trap is simple and does away with the extra separate parts usually employed in devices of this character and dispenses with all kinds of joints as well as soldering. Under ordinary use it is impossible for the trap to get out of order, and the cost of manufacture is reduced to a minimum.

Changes in the form, proportions, and minor details may be resorted to without in the least departing from the nature or spirit of the invention.

Having thus described the invention, what is claimed as new is—

1. A trap comprising a tongue with a loop and terminals with upstanding arms having inturned hooked ends, a spring-coil being located intermediately of the tongue and terminal, and a set-plate having an opening therein through which the parts of the tongue project and adapted to spread the terminals to separate the arms.

2. A trap comprising a yielding tongue having a loop and a pair of upstanding arms provided with inturned hooked terminals, the said loop of the tongue being movable over the arms, and a set-plate.

3. A trap comprising a pair of upstanding arms with inturned hooked ends at the upper portion thereof, said arms being located at the front of the trap, a tongue with a loop adapted to move over the said arms, and means for setting the trap.

4. A trap having a pair of spring-arms disposed at its entrance end and having upper hooked terminals, a tongue for controlling the said arms, and means for setting the trap.

FREDERICK WM. FRENCH.

Witnesses:
BERT STEWART CUMMINS,
JOHN OCKE.